United States Patent
Liu et al.

(10) Patent No.: US 10,298,690 B2
(45) Date of Patent: May 21, 2019

(54) METHOD OF PROACTIVE OBJECT TRANSFERRING MANAGEMENT

(71) Applicant: International Business Machines Corporation, Armonk, NY (US)

(72) Inventors: Su Liu, Austin, TX (US); Jun Su, Beijing (CN); John D. Wilson, League City, TX (US); Yin Xia, Beijing (CN)

(73) Assignee: International Business Machines Corporation, Armonk, NY (US)

(*) Notice: Subject to any disclaimer, the term of this patent is extended or adjusted under 35 U.S.C. 154(b) by 172 days.

(21) Appl. No.: 15/403,062

(22) Filed: Jan. 10, 2017

(65) Prior Publication Data
US 2018/0198789 A1    Jul. 12, 2018

(51) Int. Cl.
| | |
|---|---|
| *H04W 4/21* | (2018.01) |
| *H04W 8/00* | (2009.01) |
| *H04W 8/18* | (2009.01) |
| *H04L 29/06* | (2006.01) |
| *H04L 29/08* | (2006.01) |

(52) U.S. Cl.
CPC ........ *H04L 67/1097* (2013.01); *H04L 63/101* (2013.01); *H04L 67/06* (2013.01); *H04L 67/1021* (2013.01); *H04W 4/21* (2018.02); *H04W 8/005* (2013.01); *H04W 8/18* (2013.01)

(58) Field of Classification Search
CPC ............................ H04L 63/101; H04L 63/102
See application file for complete search history.

(56) References Cited

U.S. PATENT DOCUMENTS

| | | | |
|---|---|---|---|
| 7,698,566 B1* | 4/2010 | Stone | H04L 63/08 713/186 |
| 9,280,652 B1 | 3/2016 | Bozarth | |
| 2004/0061831 A1 | 4/2004 | Aughey et al. | |
| 2006/0047830 A1 | 3/2006 | Nair et al. | |
| 2006/0218624 A1* | 9/2006 | Ravikumar | H04L 63/102 726/3 |
| 2007/0233759 A1 | 10/2007 | Tomlinson et al. | |

(Continued)

FOREIGN PATENT DOCUMENTS

| | | |
|---|---|---|
| WO | 2008042502 A1 | 4/2008 |
| WO | 2010139843 A1 | 12/2010 |

(Continued)

OTHER PUBLICATIONS

US Patent Application entitled "Method of Proactive Obbject Transferring Management," U.S. Appl. No. 15/403,032, filed Jan. 10, 2017.

(Continued)

*Primary Examiner* — Daniel B Potratz
(74) *Attorney, Agent, or Firm* — Patterson + Sheridan, LLP (57) ABSTRACT

Techniques are disclosed for initiating an electronic file transfer between users based on conversational context. A mobile device associated with a user detects a communication between that user and another user. A relationship between the users is determined from a profile. The relationship indicates that the users are authorized to transfer a file between mobile devices. Upon determining that a relationship exists between the users, the communication is sent to a network service. The network service evaluates the communication for an intention to transfer a file between the users.

20 Claims, 6 Drawing Sheets

(56) References Cited

U.S. PATENT DOCUMENTS

| | | |
|---|---|---|
| 2008/0002262 A1 | 1/2008 | Chirieleison |
| 2008/0271112 A1 | 10/2008 | Waker et al. |
| 2009/0319611 A1* | 12/2009 | Turakhia ............ H04L 12/1822 |
| | | 709/204 |
| 2010/0079356 A1 | 4/2010 | Hoellwarth |
| 2012/0066503 A1 | 3/2012 | Koppers |
| 2012/0243729 A1 | 9/2012 | Pasquero |
| 2013/0114804 A1* | 5/2013 | Do .......................... H04L 67/02 |
| | | 379/100.01 |
| 2015/0302252 A1 | 10/2015 | Herrera |
| 2016/0308948 A1* | 10/2016 | Zhang ................... G06F 21/604 |
| 2017/0034179 A1* | 2/2017 | Carames ................ H04L 63/10 |
| 2018/0139208 A1* | 5/2018 | Ho ........................ H04L 63/102 |

FOREIGN PATENT DOCUMENTS

| | | |
|---|---|---|
| WO | 2011154612 A1 | 12/2011 |
| WO | 2015112433 A1 | 7/2015 |

OTHER PUBLICATIONS

Hooshangi, Amir. "Reducing Development Time Using Automated Data Transfer Object," May 2012, [Available Online], https://www.researchgate.net/publication/265489992_Reducing_Development_Time_Using_Automated_Data_Transfer_Object [Abstract Only].

International Business Machines Corporation, "US Patent or Patent Applications as Treated as Related," as filed in Feb. 21, 2017.

* cited by examiner

FIG. 6

METHOD OF PROACTIVE OBJECT TRANSFERRING MANAGEMENT

BACKGROUND

The present disclosure relates to file transfer, and more specifically, to techniques for conversation-based object transfer between mobile devices.

Mobile devices allow users to transfer files from one user to others. For example, a user may share photos stored on a smartphone with other users using various means, such as through messaging applications, emails, ad hoc networks, and the like. For instance, a user may initiate a connection on the smartphone to a mobile device of another user via a wireless connection (e.g., Wi-Fi, Bluetooth, etc.). Once connected, the user may select files and the target mobile device for the transfer. Generally, the recipient (i.e., the user of the target mobile device) needs to accept the transfer before files are stored on the target mobile device. As another example, the mobile device may store files at a cloud storage location and create a sharing link with appropriate access permissions and send the link to a given destination, such as to an e-mail address or a username on a messaging service.

One concern with the these techniques is user inconvenience due to steps for handling device connection and authentication, generating share links, file and object selection, and so on. Further, such methods can be prone to human error. For example, a user may enter a target recipient incorrectly (e.g., due to some typographical error on the part of the user), which is a potential security risk.

SUMMARY

One embodiment presented herein discloses a method for initiating a file transfer between users. The method generally includes detecting, via a first mobile device associated with a first user, a communication between the first user and at least a second user. A relationship is determined between the first user and the second user based on a profile associated with the first user. The relationship indicates that the first user is authorized to send a file maintained by the first mobile device to a second mobile device associated with the second user. Upon determining that a relationship exists between the first user and the second user, the communication is sent to a network service. The network service evaluates the communication to identify a presence of an intention to transfer a file between the first user and the second user.

Another embodiment presented herein discloses a computer program product having a computer-readable storage medium storing instructions, which, when executed on a processor, performs an operation for initiating a file transfer between users. The operation itself generally includes detecting, via a first mobile device associated with a first user, a communication between the first user and at least a second user. A relationship is determined between the first user and the second user based on a profile associated with the first user. The relationship indicates that the first user is authorized to send a file maintained by the first mobile device to a second mobile device associated with the second user. Upon determining that a relationship exists between the first user and the second user, the communication is sent to a network service. The network service evaluates the communication to identify a presence of an intention to transfer a file between the first user and the second user.

Yet another embodiment presented herein discloses a system having a processor and a memory storing program code, which, when executed on the processor, performs an operation for initiating a file transfer between users. The operation itself generally includes detecting, via a first mobile device associated with a first user, a communication between the first user and at least a second user. A relationship is determined between the first user and the second user based on a profile associated with the first user. The relationship indicates that the first user is authorized to send a file maintained by the first mobile device to a second mobile device associated with the second user. Upon determining that a relationship exists between the first user and the second user, the communication is sent to a network service. The network service evaluates the communication to identify a presence of an intention to transfer a file between the first user and the second user.

DETAILED DESCRIPTION

Embodiments presented herein disclose a technique for transferring files between mobile devices. In particular, embodiments disclose a cloud-based framework for detecting, in a conversation between at least two users having mobile devices (e.g., a smartphone, wearable device such as a virtual reality headset, etc.) on hand, an intention to transfer a file stored on the mobile device of one user to the mobile device of another user during the conversation. Embodiments provide a cloud-based platform that hosts a cognitive service (e.g., as a Software-as-a-Service (SaaS)) for the users that identifies, based on context of the conversation, users who would like to share a file, which of the users is a sender and which is a recipient, the file that the users would like to share, and any operations the users would like to perform.

In such an approach, each mobile device provides a file sharing application that communicates with the cognitive service. The file sharing application may use various input sensors in the mobile device, such as a microphone and camera, to monitor user activity, including conversation between users of the cognitive service. The file sharing application may then transmit the monitored content to the cognitive service, which analyzes the content. For example, the cognitive service performs natural language processing (NLP) techniques to the content of the underlying conversation. Doing so allows the cognitive service to determine, for example, whether the topic of the conversation relates to the users discussing sharing a file on the mobile device with one another. And if so, the cognitive service may identify, based on the NLP techniques, a sender and recipient user, source and target mobile device, specified file, and the like. If identified, the cognitive service may prompt the users for confirmation for the file transfer. Once confirmed, the cognitive service directs the source mobile device to send the file to the target mobile device.

Embodiments provide an approach for transferring a file between mobile devices based on context in a conversation between users of the cognitive service. Advantageously, this approach provides a file transfer connection to be initiated proactively. For instance, the cognitive service can analyze the conversation between two users for context that triggers a file transfer connection to be established in the devices associated with the users. The cognitive service determines, from the context, whether one of users expresses a desire to transfer a file (e.g., based on natural language analysis of the conversation). Further, additional security measures (e.g., using confirmation prompts) may be applied to the file transfer to ensure that a file is authorized to be sent to the intended recipient.

Figure 1:
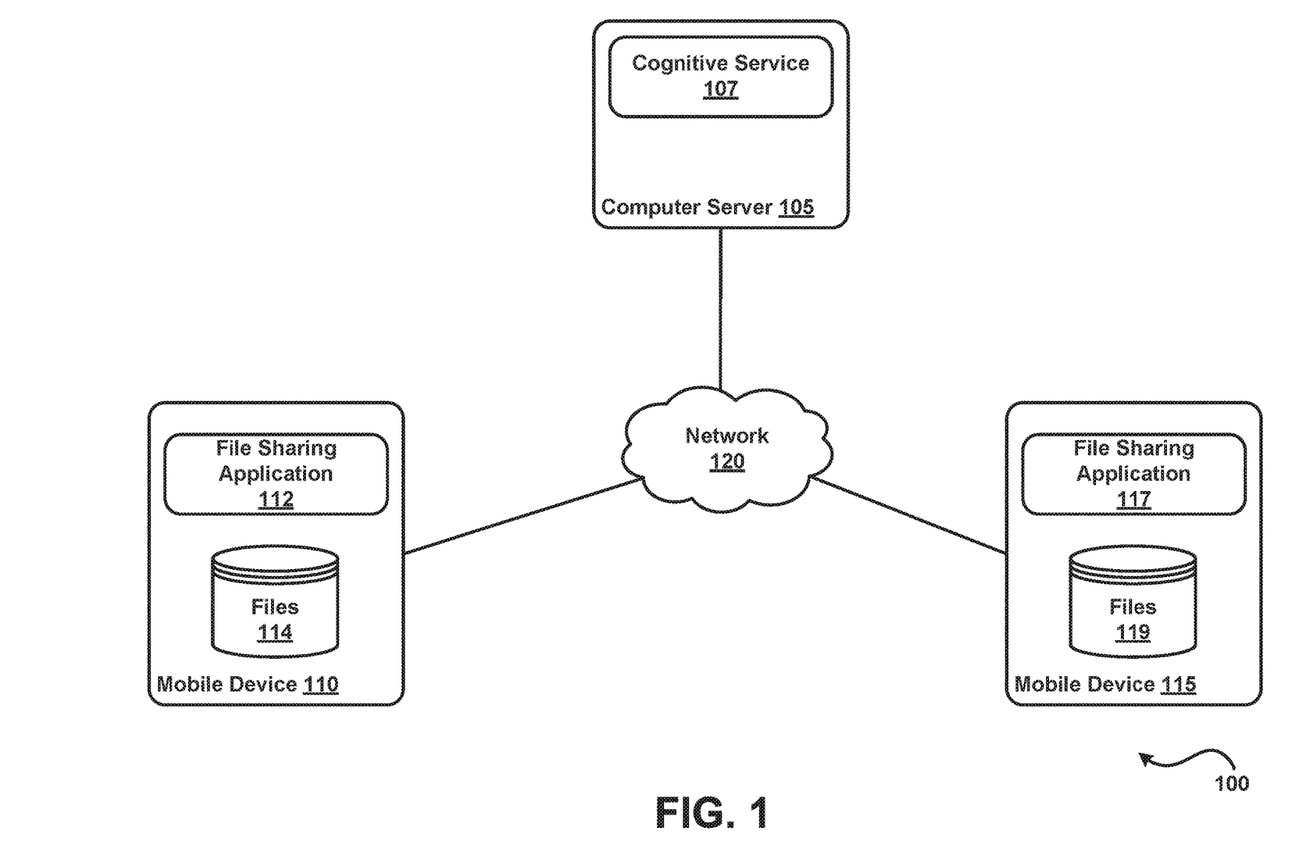
FIG. 1 illustrates an example computing environment, according to one embodiment.

FIG. 1 illustrates an example computing environment 100, according to one embodiment. As shown, the computing environment 100 includes a computer server 105, a mobile device 110, and a mobile device 115, each interconnected via a network 120 (e.g., the Internet). The computer server 105 may correspond to a physical computing system. In one embodiment, the computer server 105 is a virtualized computing instance executing as part of a cloud platform.

In one embodiment, the computer server 105 includes a cognitive service 107. The computer server 105 may provide the cognitive service 107 as a cloud computing service, such as a SaaS application accessible by client devices. As further described below, the cognitive service 107 analyzes conversations between two or more users of a service using a variety of natural language processing (NLP) techniques. Doing so allows the cognitive service 107 to identify topics in the conversation. More particularly, the cognitive service 107 identifies topics relating to a desire to share a file with another user.

For example, computing environment 100 includes a mobile device 110 and a mobile device 115. In this example, the mobile devices 110 and 115 represent smartphone devices. Of course, embodiments may be adapted to a variety of mobile devices (e.g., computing tablets, handheld gaming systems, wearable devices such as virtual reality headsets, and the like). Illustratively, the mobile device 110 includes a file sharing application 112 and files 114. Similarly, the mobile device 115 includes a file sharing application 117 and files 119. In one embodiment, the file sharing applications 112 and 117 provide a process (e.g., executing in the background of the mobile device) that enables sensors on the mobile device for detecting presence of registered users of the cognitive service, monitoring audio between two or more users interacting with one another, and the like. The file sharing application 112 (117) may send monitored audio to the cognitive service 107 for analysis. In addition, the file sharing application 112 (117) may provide voice recognition components to translate the audio into text for sending to the cognitive service 107 to preserve bandwidth. Further, the file sharing applications 112 and 117 may also include a front-end user interface for a user to configure settings on the respective applications (e.g., user permissions, toggles for monitoring, etc.).

Figure 2:
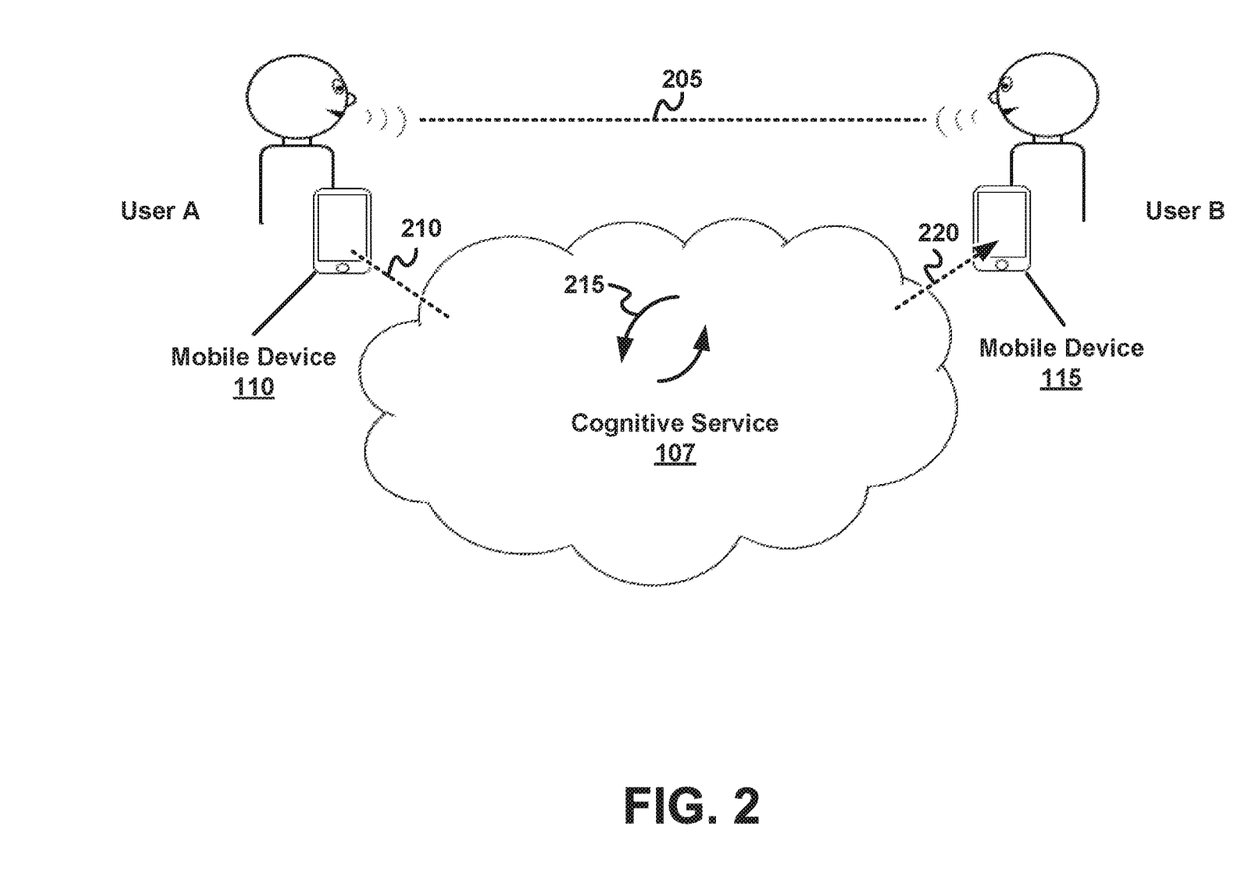
FIG. 2 illustrates a conceptual flow diagram of transferring a file from one mobile device to another using a cognitive service hosted on a cloud platform, according to one embodiment.

In one embodiment, the cognitive service 107 may direct file transfers between the mobile devices 110 and 115 via the respective file sharing applications 112 and 117, based on voice communication between the users of the mobile devices 110 and 115. FIG. 2 illustrates a conceptual flow diagram of transferring a file maintained on the mobile device 110 to the mobile device 115 using a cognitive service hosted on a cloud platform, according to one embodiment. Illustratively, a user A and a user B (users of the cognitive service 107) are conversing with one another (at 205). The mobile devices 110 and 115 monitor the conversation between the users A and B. For instance, at 210, the file sharing application 112 of mobile device 110 monitors the audio input by users A and B and forwards the audio input to the cognitive service 107. For example, assume that users A and B are discussing a party they both attended the previous evening. Also assume that user A talks about sending a particular photo from that party. The file sharing application 112 may send that audio input to the cognitive service 112.

At 215, the cognitive service 107 processes the audio input. For example, the cognitive service 107 may convert the audio to text using voice recognition. The cognitive service 107 may then perform NLP techniques on the resulting text to identify a context of the conversation. For example, context may include a topic of the conversation, e.g., weather, current events, past events, and the like. Further, the cognitive service 107 may also detect, from the context, a desire by one of the users A or B to transfer a file that is associated with that user to the other user. Continuing the previous example, the cognitive service 107 may detect that user A would like to send a particular photo from the previous evening to user B.

If detected, the cognitive service 107 may further evaluate the context to determine a sender user (based on which of the user offers to send a file), a recipient user, source mobile device, target mobile device, the file to be sent, etc. Once determined, the cognitive service 107 may send confirm with the users whether to authorize the transfer. At 220, the cognitive service 107, upon receiving confirmation, directs the source mobile device (here, mobile device 110) to the target mobile device (here, mobile device 115).

Note, although the above describes transferring files stored on a given mobile device to a location in another mobile device, transfer may also take place in storage locations external to the mobile devices. For example, the cognitive service 107 may direct transfer of a file located in a cloud storage account associated with the user of mobile device 110.

Figure 3:
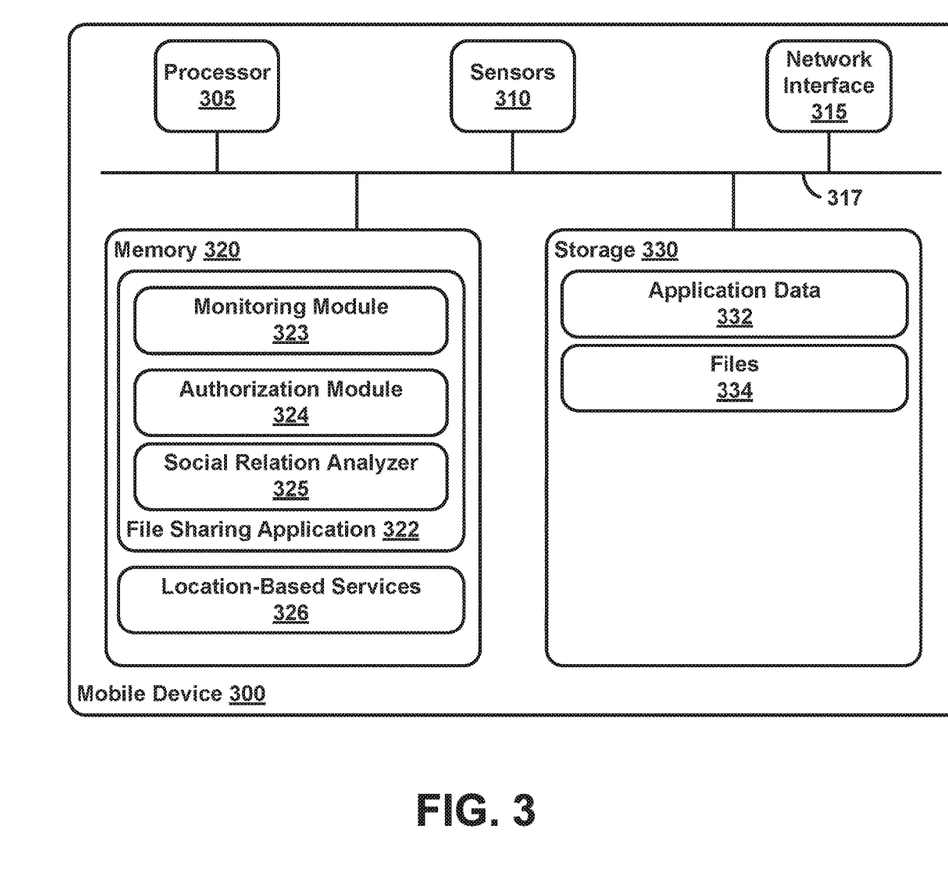
FIG. 3 illustrates a mobile device configured with a file sharing application used to transfer a file to another mobile device via a cognitive service hosted on a cloud platform, according to one embodiment.

FIG. 3 illustrates an example mobile device 300 configured with a file sharing application used to transfer a file to another mobile device via a cognitive service hosted on a cloud platform, according to one embodiment. In one embodiment, the mobile device 300 represents a smartphone. As shown, the mobile device 300 includes a processor 305, one or more sensors 310, a network interface 315, a memory 320, and a storage 330, each interconnected via a bus 317. Of course, an actual mobile device will include a variety of additional hardware components.

The processor 305 retrieves and executes programming instructions stored in the memory 320. Similarly, the processor 305 stores and retrieves application data residing in the memory 320. The bus 317 is used to transmit instructions and data between the processor 305, sensors 310, network interface 315, memory 320, and the storage 330. The processor 305 is included to be representative of a single CPU, multiple CPUs, a single CPU having multiple processing cores, and the like. The memory 320 is generally included to be representative of memory and storage on the mobile device 300.

The sensors 310 include a number of components for receiving or transmitting data. For example, the sensors 310 include a camera for obtaining a stream of image/video input in real-time. As another example, the sensors 310 include a microphone for obtaining audio input, such as voice input from users of the cognitive service 107. Further, the sensors 310 may also include scanners that capture other biometric data, such as a retinal scanner, fingerprint sensor, and the like.

Illustratively, the memory 320 includes a file sharing application 322 and location-based services 326. The storage 330 includes application data 332 and files 334. As shown, the file sharing application 322 itself includes a monitoring module 323, authorization module 324, and a social relation analyzer 325. The monitoring module 323 may enable one or more of the sensors 310 for observing activity of the user of the mobile device 300. For example, to capture audio conversation made by the user with others, the monitoring module 323 may activate a microphone in the sensors 310 and record the audio input to application data 332. Further, the monitoring module 323 may also enable sensors 310 for capturing biometric data of the user for authentication by the cognitive service 107.

The authorization module 324 may handle prompts from the cognitive service 107 to confirm a file transfer to another user device. For example, to do so, the authorization module 324 may communicate with the monitoring module 324 to detect a verbal confirmation from the user to confirm the file transfer. Another example of doing so includes the authorization module 324 generating a prompt on the front-end user interface of the file sharing application 322 requesting confirmation from the user. The authorization module 324 may forward confirmations by the user to the cognitive service 107. Further, the authorization module 324 may also validate the information to confirm from the cognitive service 107. To do so, the authorization module 324 may identify that the file path and file exists in the location provided to the cognitive service 107 and also whether the file has any permissions prohibiting the recipient user from receiving the file.

In one embodiment, the social relation analyzer 325 communicates with the location-based services 326 to identify whether other users are within the presence of the user of the mobile device 300. For example, location-based services 326 may use near-field communication (NFC) technology to detect devices in proximity to the mobile device 300 that broadcasts information indicating file transfer support under the cognitive service 107. As another example, the location-based services 326 may correlate GPS coordinates of the mobile device 300 with other mobile devices configured with file transfer support under the cognitive service 107. In addition, to preserve privacy of other users, the social relation analyzer 325 may forward location-based service information to the cognitive service 107, which in turn identifies whether other users are relatively close to the user of the mobile device 300.

The social relation analyzer 325 may evaluate the nearby users to determine whether those users have any relation with the user of the mobile device 300. In particular, the social relation analyzer 325 may evaluate user information in the application data 332. The application data 332 may provide relationship information between other users associated with the user of the mobile device 300 on the cognitive service 107. In addition, the social relation analyzer 325 may use application programming interfaces (APIs) to third-party social media services to obtain such information regarding other users associated with the user of the mobile device 300. The application data 332 indicates relationships between the users, such as whether a given user is a family member or friend of the user of the mobile device 300. The cognitive service 107 may use such relationship information to organize permissions for files being transferred to other users from the user of the mobile device 300.

When the authorization module 324 sends the confirmation to conduct the transfer of a given file between users, the cognitive service 107 may direct the file sharing application 322 to transfer one or more of the files 334 to the recipient user (or recipient group of users) based on conversations between the users, as captured by the monitoring module 323. The file sharing application 322 may do so by establishing a direct connection with the target mobile device in the event that the selected file 334 is stored on the mobile device 300. If the transfer occurs between storage accounts on the cloud platform, the cognitive service 107 may directly transfer the file located in the account of the sender to the account of the recipient.

Figure 4:
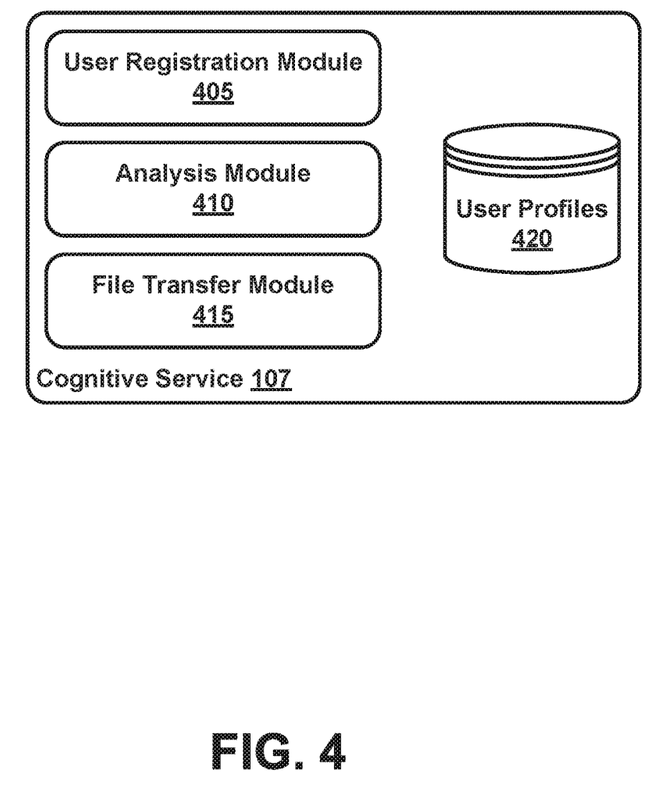
FIG. 4 illustrates a conceptual diagram of a cognitive service used to direct a transfer of a file from one mobile device to another, according to one embodiment.

FIG. 4 illustrates a conceptual diagram of a cognitive service 107, according to one embodiment. As shown, the cognitive service 107 includes a user registration module 405, an analysis module 410, a file transfer module 415, and user profiles 420.

In one embodiment, the user registration module 405 creates accounts to associate with a particular user registering for the cognitive service 107 of the cloud platform. In particular, the user registration module 405 receives and stores information regarding the user, device, etc., to a user profile 420. Such information may include basic user information, such as name, gender, contact information, and the like. Further, information may also include user authentication and biometric identification data (e.g., fingerprint, retinal, voice, facial data) captured from the mobile device. Device information may include a device type, MAC address, hardware ID, and the like.

A given user profile 420 may specify which user devices and device types may access the cognitive service 107. Further, the user profile 420 may also include configuration settings on how a sharing operation from a given device is triggered. For example, the configuration may specify that the file sharing operation is triggered using a keyword or phrase, or by conversation context. The user profile 420 may also specify instances where monitoring is not enabled, such as during a given time period. The user profile 420 may also include permissions for files, file types, and folders that may be transferred (or be prohibited from being transferred) on the mobile device.

The analysis module 410 receives monitoring data from a given mobile device. The monitoring data can include user identity information, user authentication information, biometric identification information, location-based service information, social relationship information between a user of the mobile device and other users identified in the monitoring data. The analysis module 410 may identify other users in the monitoring data based on information provided by the location-based service data. For instance, the analysis module 410 may correlate information sent by other mobile devices as to the location of the mobile devices (e.g., user authentication and location-based data sent by other mobile devices). If Further, the analysis module 410 evaluates user conversation in the monitoring data. As stated, the user conversation may be received as audio input or as converted text from the mobile device. For instance, the analysis module 410 may perform NLP techniques, e.g., tokenization of the input, speech tagging, grammar parsing, entity recognition, context identification, and the like. The analysis module 410 may determine, based on the NLP techniques, a context behind the conversation and detect whether one of the users has expressed intent to share a file with another user. If detected, the analysis module 410 may identify information relevant to conduct a file transfer, such as the file(s) to be transferred, a location of the file(s), a sender user, a recipient user, and associated devices. Other information that can be identified includes a folder on a target device to be used to saving the received file(s), a metadata package to send along with the file(s), etc. The metadata package may include a file reference, an NLP sentiment analysis, social connection strength, relation information regarding previously sent items between the users, and tags about the item as determined by the context of the conversation.

The file transfer module 415 may generate a prompt for the users involved in the file transfer to confirm and authorize the file transfer. The file transfer module 415 may receive, as authorization, a voice command, gesture-based command (e.g., an eye gaze to a sensor on the mobile device), or other standard operations relating to the mobile device itself, such as a screen touch, button press, confirmation through a front-end user interface, and so on.

Once confirmation and authorization is received, the file transfer module 415 directs transfer of the files to the specified target device. For example, the file transfer module 415 may send an indication to the source mobile device to establish a direct wireless connection with the target mobile device to send the specified file to the target mobile device. Once received, the target mobile device can store the file to a specified location. As another example, the file transfer module 415 may access the storage account associated with the sender user (e.g., via an API for accessing the storage account) and transfer the file to the storage account associated with the recipient user. As stated, when the file is transferred to the recipient in either case, the file transfer module 415 may also package the file with metadata relating to the transfer. In the case that a direct connection is established between the devices, the file transfer module 415 may direct the file sharing application on the source and target mobile devices to generate such metadata. Alternatively, the file transfer module 415 may also generate the metadata and send the metadata to the mobile devices.

Figure 5:
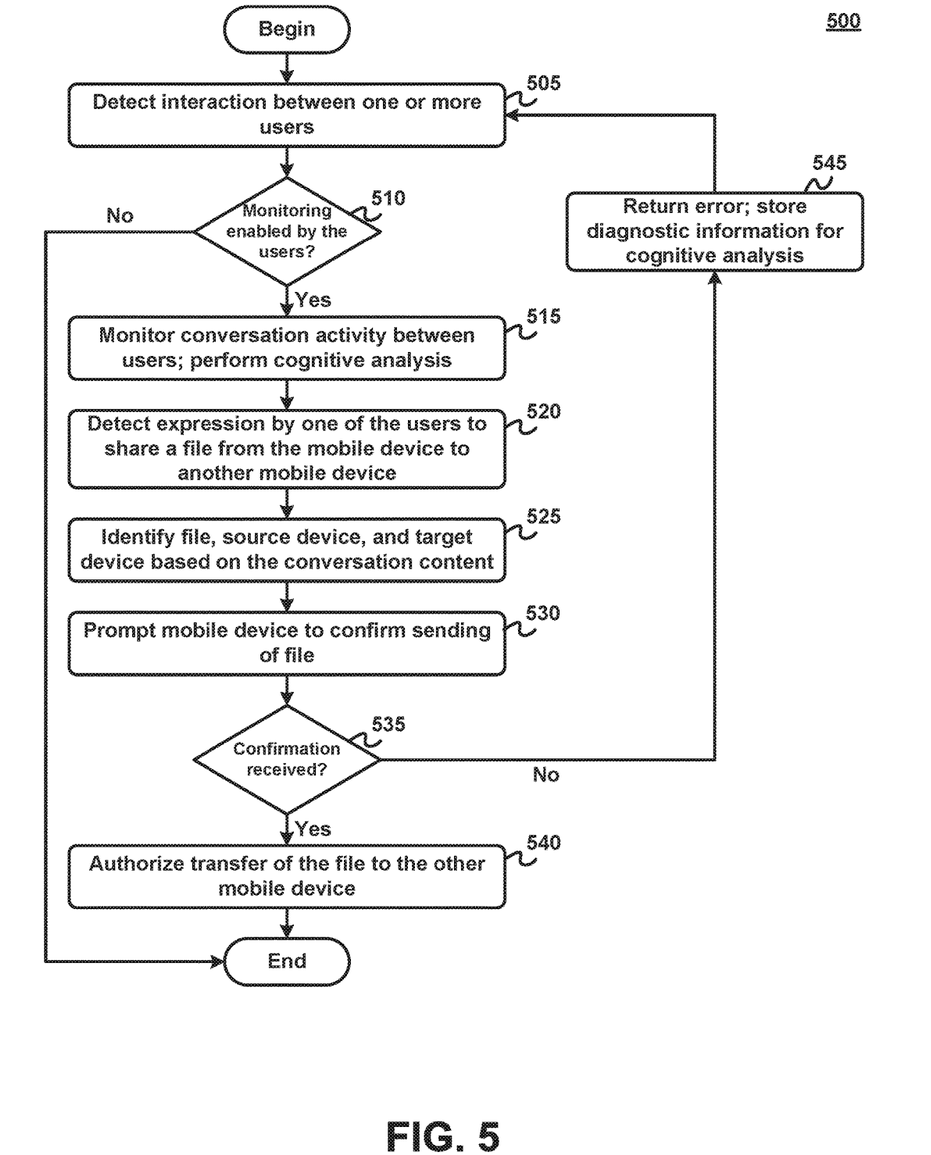
FIG. 5 illustrates a method for transferring a file to a mobile device via a cognitive service, according to one embodiment.

FIG. 5 illustrates a method 500 for transferring a file to a mobile device via a cognitive service, according to one embodiment. As shown, the method 500 begins at step 505, where the cognitive service 107 detects interaction between one or more users. For example, the cognitive service 107 may receive data from a mobile device associated with a given user, where the monitoring data includes biometric data (for authentication), geo-location service data, and social relationship data. The cognitive service 107 may correlate such information to determine whether the user of the mobile device is interacting with other users having mobile devices registered with the cognitive service 107.

When detected, at step 510, the cognitive service 107 determines whether conversation monitoring is enabled for the interacting users. To do so, the analysis module 410 may evaluate the user profiles of each of the users to identify settings that indicate whether conversation is enabled, e.g., between such users, at the time of the interaction, and the like. If not, then the method 500 ends. Otherwise, at step 515, the analysis module 410 monitors conversation activity between the users. The analysis module 410 receives monitoring data including audio input from the mobile devices. The analysis module 410 may evaluate the audio input sent by the mobile devices.

At step 520, the analysis module 410 detects an expression by one of the users to share a file from the mobile device to a mobile device of the other user. The analysis module 410 does so by performing NLP techniques on the audio input received as monitoring data from the mobile device. More particularly, the analysis module 410 determines a context of the audio input, such as whether the conversation is regarding a particular file stored on the mobile device (or on a storage location in the cloud) and a words indicating a desire to send that file to the other user.

Once detected, at step 525, the analysis module 410 identifies, based on the conversation context, information relevant to conducting a file transfer between the mobile devices. This information includes the source and target mobile devices, sender and recipient users, file, location of the file, etc. In the event that information is unavailable, the analysis module 410 may generate a prompt to one of the mobile devices to allow the users to provide such information manually.

At step 530, once the analysis module 410 has the information needed to conduct the file transfer, the analysis module 410 may prompt one or all of the mobile devices to confirm the sending of the file. To do so, the analysis module 410 may send a confirmation indication to the file sharing application of the mobile devices, where the file sharing application generates the prompt for the user on a front-end interface. Alternatively, the analysis module 410 may send a message via the file sharing application to be displayed on the front-end interface, requesting confirmation and authorization.

The analysis module 410 may receive a response to the prompt from one or all of the mobile devices. At step 535, the analysis module 410 determines whether a confirmation and authorization by the users is received. If not, then at step 545, the analysis module 410 may return an error. In doing so, the analysis module 410 collects diagnostic information relating to the error (e.g., timestamp information, conversation content, device information, file information, and the like). The analysis module 410 may then store the diagnostic information for subsequent analysis and learning. For example, the analysis module 410 may evaluate all error data to identify instances where a conversation context may yield a false positive on detecting an intention to transfer a file. Once identified, the analysis module 410 may thereafter filter such potential false positives from initiating the file transfer workflow.

Otherwise, at step 540, the cognitive service 107 authorizes the transfer of the file to the other mobile device. For example, the cognitive service 107 may send a message to the source mobile device to transfer the file, which triggers the mobile device to establish a direct file transfer connection with the mobile device, access the file, and send the file to the target mobile device. As stated, the cognitive service 107 may also access the storage accounts of the users on the cloud platform if the file is located therein. In such a case, the cognitive service 107 may directly the send a copy of the file to the storage account of the recipient user.

Figure 6:
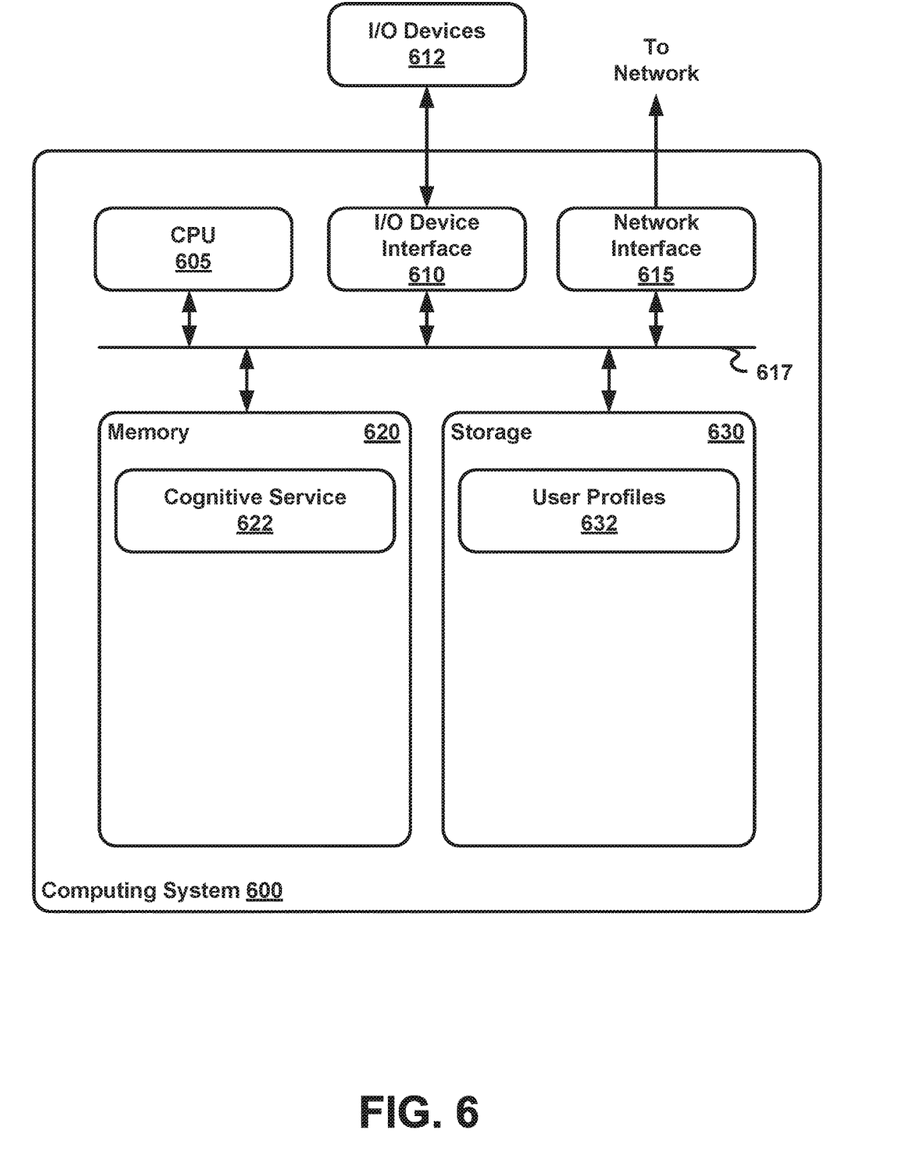
FIG. 6 illustrates a computing system hosting a cognitive service used to transfer a file to a mobile device, according to one embodiment.

FIG. 6 illustrates a computing system 600 hosting a cognitive service used to transfer a file to a mobile device, according to one embodiment. As shown, the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, display, mouse devices, etc.) to the computing system 600. Further, in context of the present disclosure, the computing elements shown in the computing system 600 may correspond to a physical computing system (e.g., a system in an enterprise network) or a virtual computing instance.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes a cognitive service 622. And storage 630 includes one or more user profiles 632. The cognitive service 622 obtains conversation data (e.g., as audio or text input) from users registered to the cognitive service 622 and analyzes the underlying conversation (e.g., based on NLP techniques) to determine whether the conversation indicates a desire by the users to share a file or group of files with one another. The cognitive service 622 may also evaluate the user profiles 632 corresponding to each user to determine, e.g., permissions relating to each user and the files. The cognitive service 622, once detected, may direct a transfer of the files between mobile devices associated with the users.

The descriptions of the various embodiments of the present disclosure are for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Embodiments may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments presented herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the cognitive service) or related data available in the cloud. For example, the cognitive service executes on a computing system in the cloud and analyzes conversation data from user devices to identify instances where users desire to share files with one another. In such a case, the cognitive service could directly transfer files at a storage location in the cloud associated with a given user to another storage location on the cloud associated with another user. Doing so allows a user to access this information from any computing system attached to a network connected to the cloud (e.g., the Internet).

While the foregoing is directed to embodiments of the present disclosure, other and further embodiments may be devised without departing from the basic scope thereof, and the scope thereof is determined by the claims that follow.

What is claimed is:

1. A method for initiating a file transfer between devices, comprising:
    detecting, via a first mobile device, an oral communication between a plurality of users;
    analyzing the oral communication using one or more voice recognition models to identify a first user and a second user participating in the oral communication;
    determining that the first mobile device is associated with the first user;
    identifying a second mobile device associated with the second user;
    determining, based on a location-based service, that that first user and the second user are within a predefined proximity, based on respective locations of the first and second mobile devices;
    determining a relationship between the first user and the second user based on a profile associated with the first user, wherein the relationship indicates that the first user is authorized to send a file maintained by the first mobile device to the second mobile device; and
    upon determining that the first user is authorized to send the file to the second user:
        sending the oral communication to a network service, wherein the network service evaluates the oral communication to identify a presence of an intention to transfer a file between the first user and the second user.

2. The method of claim 1, wherein determining the relationship between the first user and the second user further comprises:

determining, based on the profile associated with the first user, that communication monitoring is enabled only during one or more specified time periods;

determining a current time; and determining that communication monitoring by the network service is enabled for the first user, based on the one or more specified time periods and the current time.

3. The method of claim 1, further comprising:

receiving a prompt from the network service confirming transfer of a file specified in the oral communication;

confirming that the file exists in a location specified by the network service; and sending a response to the prompt, the response confirming the transfer of the file.

4. The method of claim 1, wherein upon receiving the oral communication, the network service further:

determines a context of the oral communication, wherein determining the context of the oral communication comprises determining a topic of the oral communication;

detects, based on the context of the oral communication, a request between the first user and the second user to share a file maintained by the first user;

validates the request, wherein validating the request comprises:

identifying the file that was requested to be shared; and determining that the identified file exists in one or more storage systems associated with the first user; and upon successfully validating the request, initiates the file transfer of the file from a storage device associated with the first user to a storage device associated with the second user.

5. The method of claim 3, wherein the file is stored in a cloud storage account location associated with the first user.

6. The method of claim 1, further comprising:

generating a text transcript of the oral communication; and sending the text transcript to the network service.

7. The method of claim 1, wherein the relationship is further determined based on social media data associated with the first user and the second user.

8. A computer program product, comprising:

a computer-readable storage medium storing instructions, which, when executed on a processor, performs an operation for initiating a file transfer between devices, comprising:

detecting, via a first mobile device, an oral communication between a plurality of users;

analyzing the oral communication using one or more voice recognition models to identify a first user and a second user participating in the oral communication;

determining that the first mobile device is associated with the first user;

identifying a second mobile device associated with the second user;

determining, based on a location-based service, that that first user and the second user are within a predefined proximity, based on respective locations of the first and second mobile devices;

determining a relationship between the first user and the second user based on a profile associated with the first user, wherein the relationship indicates that the first user is authorized to send a file maintained by the first mobile device to the second mobile device; and upon determining that the first user is authorized to send the file to the second user:

sending the oral communication to a network service, wherein the network service evaluates the oral communication to identify a presence of an intention to transfer a file between the first user and the second user.

9. The computer program product of claim 8, wherein determining the relationship between the first user and the second user further comprises:

determining, based on the profile associated with the first user, that communication monitoring is enabled only during one or more specified time periods;

determining a current time; and determining that communication monitoring by the network service is enabled for the first user, based on the one or more specified time periods and the current time.

10. The computer program product of claim 8, wherein the operation further comprises:

receiving a prompt from the network service confirming transfer of a file specified in the oral communication;

confirming that the file exists in a location specified by the network service; and sending a response to the prompt, the response confirming the transfer of the file.

11. The computer program product of claim 8, wherein upon receiving the oral communication, the network service further:

determines a context of the oral communication, wherein determining the context of the oral communication comprises determining a topic of the oral communication;

detects, based on the context of the oral communication, a request between the first user and the second user to share a file maintained by the first user;

validates the request, wherein validating the request comprises:

identifying the file that was requested to be shared; and determining that the identified file exists in one or more storage systems associated with the first user; and upon successfully validating the request, initiates the file transfer of the file from a storage device associated with the first user to a storage device associated with the second user.

12. The computer program product of claim 10, wherein the file is stored in a cloud storage account location associated with the first user.

13. The computer program product of claim 8, wherein the operation further comprises:

generating a text transcript of the oral communication; and sending the text transcript to the network service.

14. The computer program product of claim 8, wherein the relationship is further determined based on social media data associated with the first user and the second user.

15. A system, comprising:

a processor; and a memory storing program code, which, when executed on the processor, performs an operation for initiating a file transfer between devices, comprising:

detecting, via a first mobile device, an oral communication between a plurality of user;

analyzing the oral communication using one or more voice recognition models to identify a first user and a second user participating in the oral communication;

determining that the first mobile device is associated with the first user;

identifying a second mobile device associated with the second user;

determining, based on a location-based service, that that first user and the second user are within a predefined proximity, based on respective locations of the first and second mobile devices;

determining a relationship between the first user and the second user based on a profile associated with the first user, wherein the relationship indicates that the first user is authorized to send a file maintained by the first mobile device to the second mobile device; and upon determining that the first user is authorized to send the file to the second user:

sending the oral communication to a network service, wherein the network service evaluates the oral communication to identify a presence of an intention to transfer a file between the first user and the second user.

16. The system of claim 15, wherein determining the relationship between the first user and the second user further comprises:

determining, based on the profile associated with the first user, that communication monitoring is enabled only during one or more specified time periods;

determining a current time; and determining that communication monitoring by the network service is enabled for the first user, based on the one or more specified time periods and the current time.

17. The system of claim 15, wherein the operation further comprises:

receiving a prompt from the network service confirming transfer of a file specified in the oral communication;

confirming that the file exists in a location specified by the network service; and sending a response to the prompt, the response confirming the transfer of the file.

18. The system of claim 15, wherein upon receiving the oral communication, the network service further:

determines a context of the oral communication, wherein determining the context of the oral communication comprises determining a topic of the oral communication;

detects, based on the context of the oral communication, a request between the first user and the second user to share a file maintained by the first user;

validates the request, wherein validating the request comprises:

identifying the file that was requested to be shared; and determining that the identified file exists in one or more storage systems associated with the first user; and upon successfully validating the request, initiates the file transfer of the file from a storage device associated with the first user to a storage device associated with the second user.

19. The system of claim 17, wherein the file is stored in a cloud storage account location associated with the first user.

20. The system of claim 15, wherein the operation further comprises:

generating a text transcript of the oral communication; and sending the text transcript to the network service.

* * * * *